J. SHARPE.
AERIAL MOUNTING FOR CAMERAS.
APPLICATION FILED APR. 28, 1921.
1,423,364.
Patented July 18, 1922.
2 SHEETS—SHEET 2.
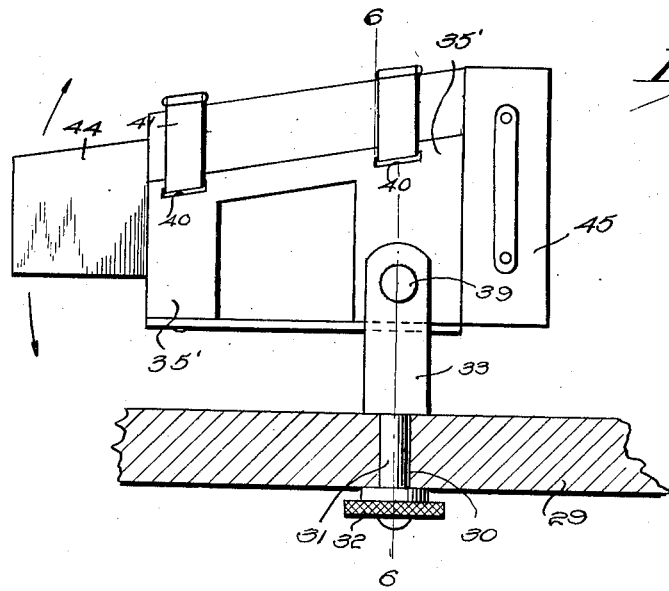
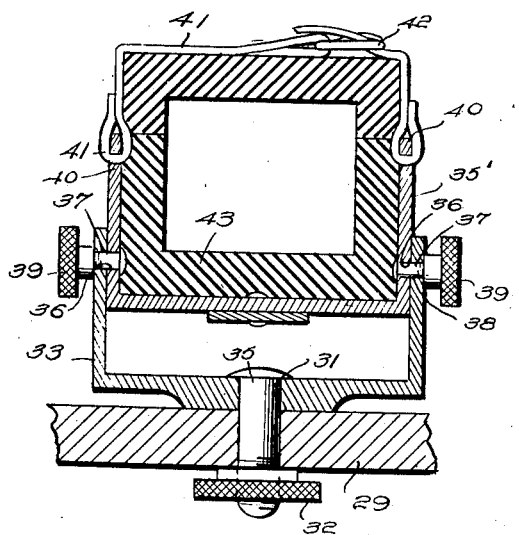
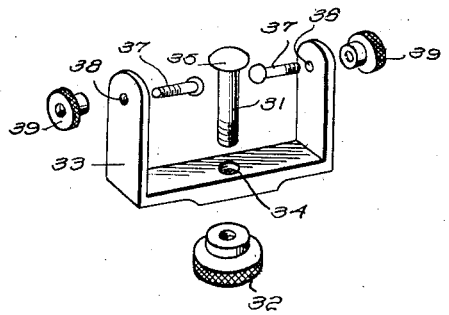
Inventor
JOSEPH SHARPE
By
Attorney

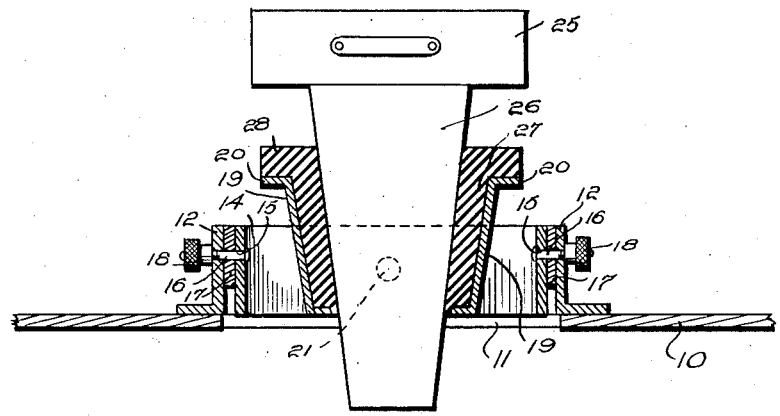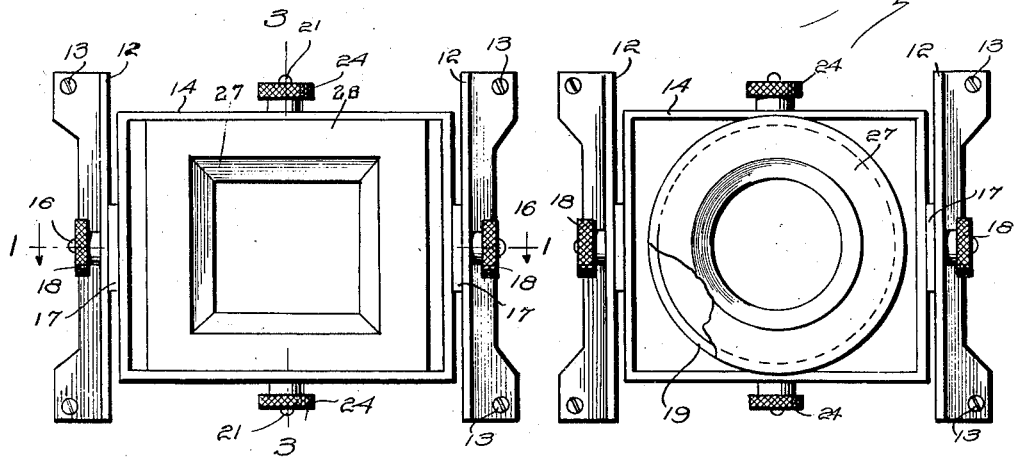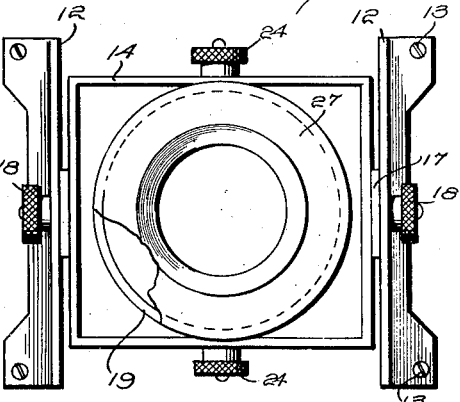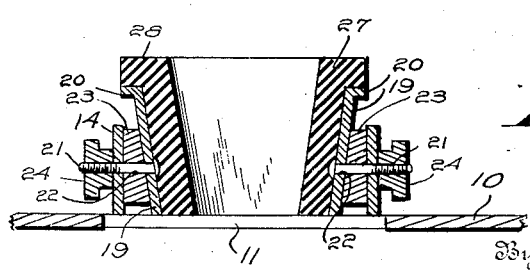

UNITED STATES PATENT OFFICE.

JOSEPH SHARPE, OF HAMPTON, VIRGINIA.

AERIAL MOUNTING FOR CAMERAS.

1,423,364.  Specification of Letters Patent.  Patented July 18, 1922.

Application filed April 28, 1921. Serial No. 465,208.

*To all whom it may concern:*

Be it known that I, JOSEPH SHARPE, a citizen of the United States, residing at Hampton, in the county of Elizabeth City and State of Virginia, have invented certain new and useful Improvements in Aerial Mountings for Cameras, of which the following is a specification.

My invention relates to an aerial mounting for cameras.

An important object of the invention is to provide a mounting for a camera, which mounting is secured to a portion of an aeroplane or the like, or a part thereon, and will permit of the angular adjustment of the camera, in various directions, and at right angles to each other, when desired.

A further object of the invention is to provide a mounting of the above mentioned character, having means for absorbing vibrations, preventing the same from being transmitted to the camera, whereby blurring of the pictures is prevented.

A further object of the invention is to provide a mounting of the above mentioned character, adapted to receive and hold cameras having portions or bellows which are circular or square in cross section, and of different sizes.

A further object of the invention is to provide a mounting of the above mentioned character, which is simple in construction, strong and durable and cheap to manufacture.

Other objects and advantages of the invention will be apparent during the course of the following description.

In the accompanying drawings forming a part of this specification, and in which like numerals are employed to designate like parts throughout the same, Fig. 1 is a central vertical sectional view through a mounting embodying my invention, taken on line 1—1 of Figure 2, Fig. 2 is a plan view of the same, Fig. 3 is a transverse section taken on line 3—3 of Figure 2, Fig. 4 is a plan view of a slightly different form of mounting, Fig. 5 is a side elevation of a still further different form of mounting embodying the invention, Fig. 6 is a transverse section taken on line 6—6 of Figure 5, and, Fig. 7 is a perspective view of the pivot elements of the mounting, parts being separated, for the purpose of illustration.

In the drawings, wherein for the purpose of illustration are shown preferred embodiments of my invention, attention being called first to Figures 1 to 4 inclusive, the numeral 10 designates the base or floor of the fuselage of an aeroplane, which may be provided with an opening 11.

My mounting includes a pair of supports or brackets 12, arranged in an upright position near the opposite sides of the opening 11, and secured thereto by screws or bolts 13, or any other suitable means. Arranged within or between the brackets 12 is an outer frame 14, having openings 15 formed centrally through its opposite sides, these openings pivotally receiving headed pivot elements or bolts 16, passing through openings in spacing elements of washers 17, and openings in the brackets 12. The pivot elements 16 have their outer ends screw threaded for the reception of clamping nuts 18, which are preferably milled. It is thus seen that the outer frame 14 may be swung in a vertical plane upon its pivots 16, and by adjusting the nuts 18, this outer frame may be clamped to the brackets 12, in a selected angular position.

The numeral 19 designates an inner frame, which is preferably tapered, and decreases in cross sectional area downwardly. This inner frame is provided at its top with a flange 20. Pivot elements or bolts 21 have their inner ends pivotally mounted within openings 22, formed centrally through the opposite sides of the frame 19, and these bolts extend through washers or spacing elements 23, and openings in the outer frame 14, and have their outer ends screw threaded for the reception of clamping nuts 24. It is thus seen that the inner frame 19 may be swung in a vertical plane upon its pivots, at a right angle to the swinging movement of the outer frame, and may be locked in a selected angular position, by clamping up the nuts 24.

The numeral 25 designates the box or housing of a camera, and 26 the lens tube, which is adapted to be inserted within a tapered shock absorbing tube 27, which may be formed of felt, or highly soft elastic rubber, such as sponge rubber. The tube 27 fits within the inner frame 19 and is provided at its top with a flange 28, engaging over the flange 20. It is thus seen that by virtue of the taper of the tube 27, the lens tube 26 will fit snugly therein, and the tube will accommodate lens tubes of different sizes. The lens tube 26 may be square in cross section.

In Fig. 4 the inner frame 19' is formed circular instead of square, in cross section, and the shock absorbing tube 27' is also circular in cross section. The frame 19' has a flange 19''. The tube is adapted to receive the bellows of the camera, when the bellows is circular instead of square in cross section.

In Figures 5, 6 and 7, the numeral 29 designates a portion of a machine gun base or mount, upon which my improved mounting is supported. The mount 29 has a vertical opening 30 to pivotally receive a shank 31, the lower end of which is screw threaded for receiving a clamping nut 32. The shank 31 extends through the horizontal portion of a U-shaped frame 33, and is pivoted within the opening 34, therein, the shank having a head 35. The frame 33 may be swung horizontally, and by manipulation the nut 32, may be clamped to the base 29, in the desired angular position. The lower frame 33 is adjustable in a horizontal plane, while the upper frame 35', which is also U-shaped in cross section, is adjustable in a vertical plane. The frame 35' is provided upon its opposite sides with openings 36, pivotally receiving bolts 37, extending through openings 38, and carrying clamping nuts 39. By manipulation of the nuts 39, the upper frame 35' may be angularly adjusted in a vertical plane, and subsequently locked in the selected position.

The top of the upper frame 35' is formed open, and its sides are slotted at 40, receiving straps 41, the ends of which are adjustably connected by buckles 42 or the like.

The numeral 43 designates a tapered shock absorbing tube, which is preferably formed in separate upper and lower parts. This tube is formed of felt or highly elastic rubber, such as sponge rubber. The tube is adapted to receive the adjustable part of bellows 44 secured to the box or housing 45 of the camera.

In view of the foregoing description, it is thought to be obvious that in either form of the device, the bellows of the camera is securely held within the inner frame, and that the camera may be angularly adjusted, in either direction, by adjusting the inner or outer frame, as may be desired, this frame being clamped in the adjusted position.

It is to be understood that the forms of my invention herewith shown and described, are to be taken as preferred examples of the same, and that various changes in the shape, size, and arrangement of parts may be resorted to without departing from the spirit of my invention or the scope of the subjoined claims.

Having thus described my invention, I claim:

1. In an aerial mounting for cameras, an outer frame pivotally mounted upon a supporting part whereby the frame may be angularly adjusted, means for clamping the frame in a selected position, an inner frame pivotally mounted upon the outer frame and adapted to be swung at substantially a right angle to the swinging movement of the outer frame, means to lock the inner frame to the outer frame against swinging movement with relation thereto, and a shock absorbing tube held within the inner frame and adapted for the reception of the bellows of an aerial camera.

2. In an aerial mounting for cameras, an outer pivoted frame, an inner frame pivotally mounted upon the outer frame, and a shock absorbing tube held within the inner frame and adapted to receive the bellows of an aerial camera.

3. In an aerial mounting for cameras, an outer frame, an inner frame pivotally mounted therein, said inner frame being substantially U-shaped in cross section and having its top opened and provided in its sides with slots, a shock absorbing tube within the inner frame and adapted to receive the bellows of an aerial camera, and adjustable straps secured in the slots of said sides and extending over the top of the shock absorbing tube.

In testimony whereof I affix my signature.

JOSEPH SHARPE.